Sept. 25, 1928.
W. W. POTTER
1,685,556
MACHINE TOOL
Filed Oct. 14, 1927
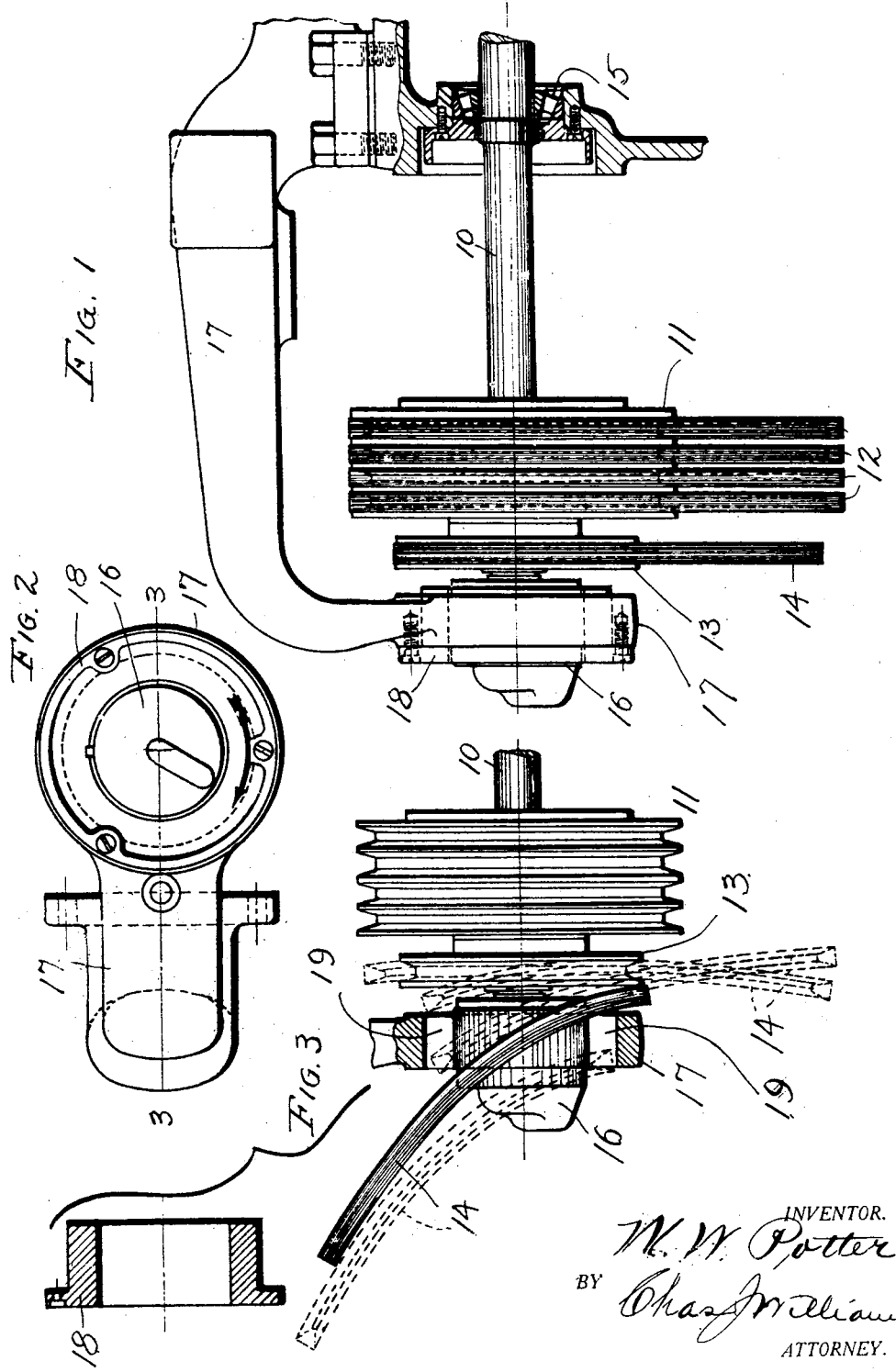
INVENTOR.
W. W. Potter
BY Chas. J. Williamson
ATTORNEY.

Patented Sept. 25, 1928.

1,685,556

UNITED STATES PATENT OFFICE.

WILLIAM WALLACE POTTER, OF PAWTUCKET, RHODE ISLAND.

MACHINE TOOL.

Application filed October 14, 1927. Serial No. 226,248.

The use of endless belts, either V, round, or other cross section for transmitting power such as from a motor to the driving pulley of a machine tool is becoming more and more common, and is at least partially superseding the use of chain drives or drives of the flat belt type.

One of the objections to endless belts in the past has been difficulty of replacing them in case of breakage or other causes which render a change necessary. It is desirable in all cases to support the driving shaft on both sides of the pulley thereon. This makes it impossible to replace an endless belt except by removing one of the supports, and that makes it necessary to remove one of the bearings. This is also undesirable, as a bearing, especially of the anti-friction type, when once adjusted is better left alone.

The object of my invention is to provide a construction which will obviate or overcome objections such as those before mentioned. My invention consists in whatever is described by or is included within the terms or scope of the appended claims.

In the drawings:

Fig. 1 is a plan view with parts in section of enough of a machine tool to illustrate an embodiment of my invention;

Fig. 2 is an end view thereof;

Fig. 3 is a detail view in horizontal section on the line 3—3 of Fig. 2 illustrating the procedure in applying a belt.

Describing in detail the embodiment of my invention shown in the drawings, the main drive shaft, 10, has upon it a grooved pulley, 11, which by multiple belts, 12, each V-shape in cross section is driven from a motor or other source of power, and also on the main shaft, 10, is another grooved pulley, 13, which by means of a similar endless belt, 14, transmits power to some other rotating member of the machine. The main shaft, 10, is supported in bearings between which the pulleys and belts are located, one bearing, 15, being mounted in a part of the machine frame, and the other bearing, 16, being mounted in an arm, 17, bolted to the main frame of the machine and extending therefrom parallel with the main shaft and reaching around the pulleys and belts to the shaft. This arrangement produces the conditions which create the problem of ready removal and replacement of belts. By my invention this problem is solved by placing the bearing, 16, in a ring-form bushing or thimble, 18, secured by bolts or screws to the arm, 17, and occupying an annular hole or recess, 19, in the arm concentric with the main shaft, so that when said bushing or thimble is removed from the arm, as shown in Fig. 3, an annular space will be left or provided around the bearing, 16, through which, as shown by full and dotted lines in Fig. 3, each of the endless belts may be easily and readily passed both for the purpose of removing the belt and for applying another belt. Thus, I am able to prevent the necessity of disturbing the shaft bearings and to perform the operation of removing and replacing a belt quickly and easily.

What I claim is:

1. A machine tool having a shaft and belt gearing comprising a pulley on the shaft and an endless belt, bearings for said shaft on opposite sides of said pulley and a frame member reaching over said pulley, an opening being provided around one of said bearings through which said belt may be bodily passed.

2. A construction as in claim 1 in which the opening is normally occupied by a removable ring.

3. A construction as in claim 1 in which the bearing past which the endless belt may be moved is supported by an arm reaching outward from the machine frame.

In testimony whereof I hereunto affix my signature.

WILLIAM WALLACE POTTER.